3,247,220
REARRANGEMENT OF AZIRIDINYLFORMATE ESTERS

George E. Ham, Lake Jackson, Tex., assignor to The Dow Chemical Company, Midland, Mich., a corporation of Delaware
No Drawing. Filed Sept. 9, 1963, Ser. No. 307,303
19 Claims. (Cl. 260—307)

The present invention relates to processes for effecting molecular rearrangements in esters of 1-aziridinylformic acid (I) whereby oxazolines (II) and/or oxazolidinones (III) are formed. The reactions involved in the process may be represented as follows:

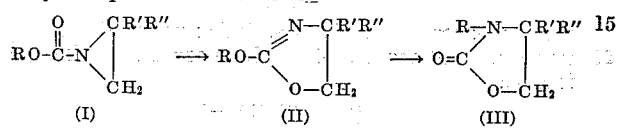

wherein R is a hydrocarbon radical and R' and R" are H or hydrocarbon radicals. All such hydrocarbon radicals may have at least up to 18 carbon atoms but preferably have no more than 8 carbon atoms. Any substituents should be inert in the reactions of the process.

If R is attached through a $CH_2$ group both of the above reactions occur when I is warmed with alkali metal iodide in a suitable inert solvent, II being the initial product and III the final product. Thus, when II is the desired product the reaction time should be short and/or the reaction temperature low in order to minimize the conversion of II to III. Conversely, when III is the desired product, the reaction should be conducted at a higher temperature and/or for a longer time.

The above rearrangement of I is catalyzed by alkali metal iodide and is suitably conducted in an inert, aprotic, polar solvent. Suitable solvents include aliphatic nitriles, nitroalkanes, dialkyl sulfoxides, dialkyl formamides and the like. The preferred procedure is to conduct the reaction in acetonitrile in the presence of 0.1 to 1 mole of NaI per mole of I.

The reaction is suitably conducted at temperatures of about 50–150° C., the lower range of about 50–100° being preferred when II is the desired product and the higher range of about 100–150° being preferred when III is the desired product.

Pressure is not critical in the processes of the invention, atmospheric pressure being preferred as a practical matter, though higher or lower pressures can be used.

The practice of the invention is illustrated by the following examples.

Example 1

A mixture of 23 g. of ethyl 1-aziridinylformate and 3 g. of NaI (10:1 molar ratio) in 300 ml. of acetonitrile was refluxed (about 80° C.) for 96 hours. It was then cooled to −10° C. and filtered. The solvent was evaporated at 100 mm. pressure and 40° C., after which the pressure was reduced to 1 mm. and distillation continued. The residue consisted of 10.1 g. of N-ethyl-2-oxazolidinone (III) while redistillation of the distillate produced 10.66 g. of 2-ethoxy-2-oxazoline (II). The latter had the following properties: B.P., 96° C./100 mm.; $n_D^{20}$, 1.4330; $d_{20}$, 1.041; percent C, 51.96; percent H, 8.09; percent N, 13.16 (calcd., percent C, 52.16; percent H, 7.88; percent N, 12.17). The yields based on I used were 46.4% of II and 44.8% of III.

Example 2

A mixture of 23 g. of I and 5 g. of NaI (6:1 molar ratio) in 340 ml. of acetonitrile was refluxed 24 hours and then worked up as described in Example 1, thus producing yields of 46.4% of II and 38.6% of III.

Example 3

A mixture of 23 g. of I and 15 g. of NaI (2:1 molar ratio) in 500 ml. of acetonitrile was refluxed 24 hours and then worked up as in Example 1, thus producing a 22.1% yield of II and an undetermined amount of III.

Other aziridinylformate esters within the scope of the invention can be similarly isomerized as described above to produce the corresponding 2-substituted-2-oxazolines or N-substituted-2-oxazolidinones. Among the suitable aziridinylformates are the alkyl and alkenyl, and particularly the lower alkyl and alkenyl esters, i.e., those wherein the alkyl or alkenyl radical contains up to 8 carbon atoms, such as methyl, propyl, isopropyl, butyl, isobutyl, sec.-butyl, amyl, hexyl, octyl, allyl, 2-butenyl, isobutenyl, pentenyl, octenyl, and propargyl aziridinylformates; cycloalkyl esters, especially cyclopentyl and cyclohexyl aziridinylformates; aralkyl esters, such as benzyl, 2-phenylethyl and 2- and 3-phenylpropyl arizidinylformates; and the aryl esters, such as phenyl, tolyl, xylyl and naphthyl aziridinylformates. Also useful are the above esters of substituted-aziridinylformic acids, such as the 2-alkyl-aziridinylformic acids, such as 2-methyl, 2-ethyl, 2-isobutyl and 2-octylaziridinylformates; the 2-alkenylaziridinylformates, such as 2-allyl, 2-methyallyl, 2-(2-butenyl)- and 2-(5-hexen-1-yl)aziridinylformates; the 2-arylaziridinylformates, such as 2-phenyl, 2-tolyl, 2-cresyl- and 2-naphthylaziridinylformates, as well as the 2,2-disubstituted-aziridinylformates wherein the substituents are of the types named above.

As indicated above, Product III can be produced only when R is attached through a $CH_2$ group; i.e., R must be a primary aliphatic radical. Such radicals may be represented by the formula $R'''CH_2$— wherein $R'''$ is hydrogen or a hydrocarbon radical.

I claim:
1. The process for isomerizing an aziridine having the formula

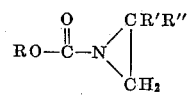

to produce an oxazoline having the formula

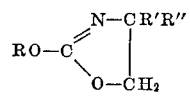

where in each of the above formulas R represents a hydrocarbon radical and R' and R" represent H or R, said process comprising contacting the aziridine with an alkali metal iodide at a temperature of about 50 to 150° C.

2. The process for isomerizing an oxazoline having the formula

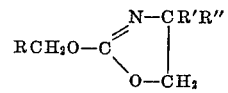

to produce an oxazolidinone having the formula

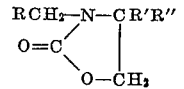

where in the above formulas R represents a hydrocarbon radical and R' and R" represent H or R, said process comprising contacting the oxazoline with an alkali metal iodide at a temperature of about 50 to 150° C.

3. The process of claim 1 wherein the iodide is sodium iodide.

4. The process of cliam 1 wherein R represents a radical selected from the group consisting of alkyl, alkenyl, cycloalkyl, aralkyl and aryl radicals.

5. The process of claim 4 wherein R contains not more than 8 carbon atoms.

6. The process of claim 1 when conducted in an inert aprotic solvent.

7. The process for isomerizing an aziridine having the formula

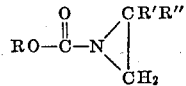

to produce a mixture of
(a) a compound having the formula

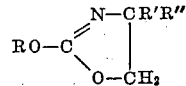

and
(b) a compound having the formula

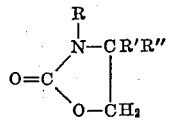

where in each of the above formulas R represents a hydrocarbon radical and is attached through a $CH_2$ group, and R' and R" represent radicals selected from the group consisting of H and R, said process comprising contacting said aziridine with a catalytic amount of an alkali metal iodide at a temperature of about 50–150° C.

8. The process of claim 7 wherein R' and R" are H.

9. The process of claim 8 wherein R repersents a lower alkyl radical.

10. The process for isomerizing an aziridine having the formula

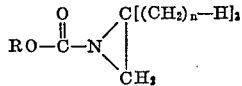

to produce an oxazolidinone having the formula

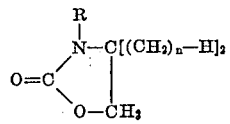

where in the above formulas R represents a lower alkyl radical and each $n$ is an integer from 0 to 8, inclusive, said process comprising contacting the aziridine with a catalytic amount of an alkali metal iodide at a temperature of about 50–150° C. and for a time sufficient to produce the oxazolidinone.

11. The process of claim 10 wherein each $n$ is 0 and the catalyst is NaI.

12. The process of claim 10 when conducted in an inert aprotic solvent.

13. The process of claim 12 wherein the solvent is acetonitrile.

14. The process for making an oxazoline having the formula

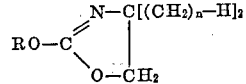

comprising contacting with a catalytic amount of an alkali metal iodide at about 50–150° C. an aziridine having the formula

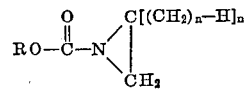

where in the above formulas R represents a lower alkyl radical and each $n$ is an integer from 0 to 8 inclusive.

15. The process of claim 12 wherein each $n$ is 0 and the catalyst is NaI.

16. The process of isomerizing ethyl 1-aziridinylformate to produce a mixture of 2-ethoxy-2-oxazoline and N-ethyl-2-oxazolidinone comprising contacting the ethyl 1-aziridinylformate with a catalytic amount of an alkali metal iodide at a temperature of about 50–150° C.

17. The process of claim 16 when conducted in an inert aprotic solvent.

18. The process of claim 17 wherein the solvent is acetonitrile.

19. The process of claim 18 wherein the catalyst is NaI and is used in an amount of 0.1 to 1 mole per mole of ethyl 1-aziridinylformate.

No references cited.

NICHOLAS S. RIZZO, *Primary Examiner.*